Figure 1:
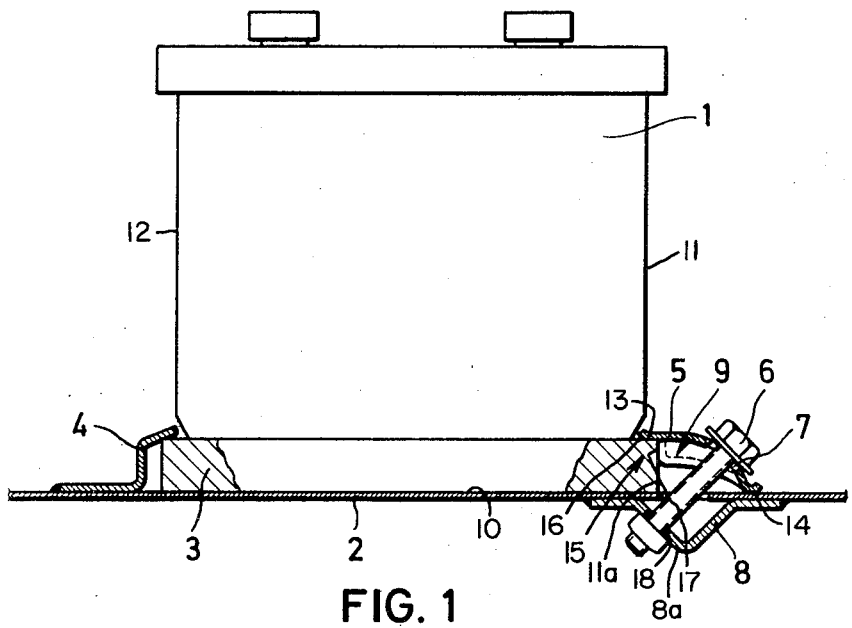

United States Patent

Aldag

[15] 3,651,883

[45] Mar. 28, 1972

[54] HOLDING CLAMP FOR BATTERY HOUSINGS

[72] Inventor: Walter Aldag, Wolfsburg, Germany

[73] Assignee: Volkswagenwerk Aktiengesellschaft, Wolfsburg, Germany

[22] Filed: Sept. 26, 1969

[21] Appl. No.: 861,411

[30] Foreign Application Priority Data

Sept. 27, 1968 Germany ..................... P 17 80 551.5

[52] U.S. Cl. .......................................... 180/68.5, 248/361 B
[51] Int. Cl. ............................................ B60r 18/02
[58] Field of Search ........................... 180/68.5; 248/361 B

[56] References Cited

UNITED STATES PATENTS 3,199,624  8/1965  Burns et al. ........................... 180/68.5

FOREIGN PATENTS OR APPLICATIONS 671,467  10/1963  Canada ................................. 180/68.5

Primary Examiner—Benjamin Hersh
Assistant Examiner—Milton L. Smith
Attorney—Watson, Cole, Grindle & Watson

[57] ABSTRACT

A device for clamping down a battery housing on a base plate having stop bracket and a clamp so that a screw bolt passing through the plate and bracket will secure the housing down on the base plate.

6 Claims, 2 Drawing Figures

PATENTED MAR 28 1972　　　　　　　　　　　　　　3,651,883

INVENTOR.
Walter Aldag
BY
Watson Cole Grindle + Watson
Attys.

HOLDING CLAMP FOR BATTERY HOUSINGS

This invention relates to a device for clamping down battery housings on a base plate as a clamp, which reaches with an angle section over a longitudinal edge of the housing base and clamps the latter laterally by means of a screw against a stop bracket.

Such devices which are used predominantly in the case of motor vehicle construction have already been known in some types of structure. In the case of one design, the lateral clamping of the housing base by means of a profile plate being supported by the edge of the base takes place by the fact that said profile plate is pulled downwards with its other end by means of a perpendicular screw connection along the slantingly bent-up edge of the base plate, so that in consequence of the wedging action, a horizontal movement of the profile plate takes place against the housing base. This principle is realized in the case of another known design by the fact that the end of the profile plate facing away from the housing base is bent downwards at an acute angle penetrating the base plate and that it cooperates with a corresponding butt strap likewise bent out downwards from the base plate.

In the case of these structures, it is disadvantageous that the nut and the head of the screw have no precise supporting surface for the profile plate since the profile plate in its clamped state and in consequence of production tolerances is only rarely parallel to the base plate. Besides the screw can tilt easily, since the profile plate and also the clamp shift perpendicularly in relation to the axis of the screw.

It is therefore an object of this invention to avoid these disadvantages in that in the perpendicular section in relation to the base plate, the screw will contact along the clamp at an angle of inclination which is at an angle of inclination to the base plate, while said clamp with that of its ends facing away from the housing base is supported freely on the flat base plate. At the same time the clamp is developed advantageously in the shape of a groove and has a transversely running oblong hole for the reception of the screw whereby impressions have been provided for the formation of the angle section embracing the housing base, said impressions starting at a distance from its longitudinal edge. Beyond the base plate there will effectively be a solid support which serves as an abutment for the screw penetrating the base plate.

The invention has the advantage of a simple and inexpensive construction because there is no need for any deformation of the base plate which therefore can be developed flat. As a result thereof, it is guaranteed that the clamp can always be displaced in parallel to the base plate. Consequently and also because of the slanting setting of the clamping screw, the danger of tilting of this screw has been lowered considerably and a good fit of the nut and of the head of the screw perpendicularly to the axis of the screw has been largely insured.

Figure 2:
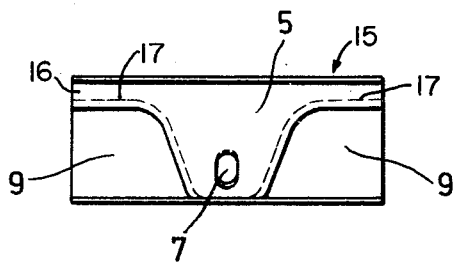

Further objects of the invention will be apparent from the following description when considered in connection with the accompanying drawing in which, FIG. 1 is a side view partly in section showing a device for the attachment of a battery, and FIG. 2 is a top view showing the clamping down of the device.

The reference numeral 1 represents a battery housing of a motor vehicle, said housing having a flat bottom 10 resting on a base plate 2 and generally vertical side walls 11 and 12. The two outsides of the housing base 3 opposite each other are clamped between supports whereby one support has been constructed as an upwardly projecting stop in the nature of a fixed angle 4 directed slightly slantingly upward with its upper leg, and the other stop is in the form of a groovelike clamp element 5 for the actual clamping down of the battery. The clamp element 5 is supported against the smooth base plate 2 and with an angle section formed by impressions 9, overlaps the upwardly facing, inwardly extending surface 13 of a longitudinal edge of the housing base 3.

The clamping down of the battery is accomplished by means of a screw or bolt 6 which is inserted into a transversely running oblong hole 7 of the clamp element 5 and penetrates the base plate 2 at approximately 45°. As can be seen, screw 6 extends in a direction downwardly and toward the housing 1. At the same time the screw 6 is supported by the curvature of the clamp element 5 and is held on the other side of the base plate 2 in a bracket 8.

As can be seen viewing FIG. 1, clamp element 5 extends generally angularly between base plate 2 and housing 1 and has a rounded edge portion 14 disposed for bearing against base plate 2. Element 5 also includes a transversely L-shaped angle section 15 presenting an abutment 16 which bears against surface 13 and an abutment 17 which bears against the lower portion 11a of sidewall 11 adjacent surface 13. Screw 6 is received in an opening 18 in the angularly disposed section 8a of bracket 8. Manifestly, the axis of opening 18 approaches housing 1 in a downwardly direction whereby to properly align screw 6. When tightening screw 6, clamp element 5 is forced in an angular direction simultaneously toward sidewall 11 and surface 13. Thus, horizontal and perpendicular forces are transferred to the housing base 3 whereby a possibly existing play between supports is compensated for by a horizontal gliding of the edge 14 of the clamp element 5 along base plate 2, and by a gliding of the screw 6 in the oblong hole 7. The stop bracket 4, the clamp element 5 and the bracket 8 can be manufactured as pressed or stamped parts of sheet metal.

I claim:

1. Device for clamping down battery housings on a base plate comprising a stop bracket, a clamp which overlaps with an angle section on a longitudinal edge of a housing base plate and clamps the latter laterally against the stop bracket, said clamp having a perpendicular section in relation to the base plate and a screw for the clamp arranged at an angle of inclination which is transverse in relation to the base plate while said clamp is supported freely on base plate with its ends away from the housing base plate, there being provided a bottom bracket on the other side of the base plate firmly connected with said plate to serve as an abutment for the screw passing through the base plate, said bottom bracket including an angularly disposed section having an opening for receiving said screw, the position of said section being such that the axis of said screw approaches said housing in a downwardly direction.

2. Clamp structure for securing a battery housing against a base plate having an upwardly projecting stop affixed thereon, said housing having a flat bottom slidably engageable with said base plate, generally vertical side walls, one of which is engageable with said stop, and an upwardly facing longitudinal edge surface extending inwardly of the housing on the opposite side thereof from said one wall, said structure comprising:

a clamp element adapted to extend generally angularly between the base plate and the housing, said element including an edge portion disposed for slidably engaging and bearing against said base plate, a first abutment disposed to bear against said edge surface of the housing and a second abutment disposed to bear against a sidewall of the housing adjacent said upwardly facing edge surface; and fastener means releasably interconnecting said element and the base plate, said fastener means being disposed to force said element in an angular direction simultaneously toward said sidewall and said edge surface to urge the element to slide on the plate toward the housing and to force the housing against said stop and said base plate.

3. Structure as set forth in claim 2 wherein said element has a hole therethrough disposed between said edge portion and said abutments, there being fastener supporting means on the base plate disposed closer to the housing than said hole, said fastener means including a screw supported by said supporting means and extending through the hole, said screw being disposed at an angle extending downwardly and toward the housing whereby to apply said force.

4. Structure as set forth in claim 3 wherein said hole is oblong in a direction toward and away from said edge surface.

5. Structure as set forth in claim 2 wherein said element includes a transversely L-shaped angle section presenting said abutments, said edge portion including a rounded edge adapted for engaging the base plate and gliding thereon during tightening of the clamp structure.

6. A device for clamping down battery housings on a base plate comprising a stop bracket, a lamp which overlaps with an angle section on a longitudinal edge of a housing base plate and clamps the latter laterally against the stop bracket, said clamp having a perpendicular section in relation to the base plate and a screw for the clamp disposed at an angle of inclination which is transverse in relation to the base plate while said clamp is supported freely on the base plate with its ends away from the housing base plate, there being provided screw supporting means on the base plate firmly connected with said plate for supporting the screw at said angle of inclination, the position of said means being such that the longitudinal axis of said screw approaches said housing in a downwardly direction.

* * * * *